United States Patent [19]
Takahashi et al.

[11] Patent Number: 5,655,165
[45] Date of Patent: Aug. 5, 1997

[54] PHOTOGRAPHIC DATA RECORDING CAMERA

[75] Inventors: Yoshiharu Takahashi; Yoshiyuki Nojima, both of Hachioji, Japan

[73] Assignee: Konic Corporation, Tokyo, Japan

[21] Appl. No.: 455,132

[22] Filed: May 31, 1995

[30] Foreign Application Priority Data

Jun. 3, 1994 [JP] Japan ................. 6-122640

[51] Int. Cl.$^6$ ................................. G03B 17/24
[52] U.S. Cl. ........................... 396/315; 396/318
[58] Field of Search ................... 354/105, 106, 354/173.1, 173.11; 355/39; 396/315, 317, 318, 316, 310

[56] References Cited

U.S. PATENT DOCUMENTS

| | | | |
|---|---|---|---|
| 4,508,438 | 4/1985 | Kanaoka et al. | 354/105 |
| 5,128,711 | 7/1992 | Terashita et al. | 355/41 |
| 5,389,989 | 2/1995 | Hawkins et al. | 354/106 |

FOREIGN PATENT DOCUMENTS

| | | |
|---|---|---|
| 60-107631 | 6/1985 | Japan. |
| 60-107632 | 6/1985 | Japan. |
| 3-256033 | 11/1991 | Japan. |

*Primary Examiner*—Russell E. Adams
*Assistant Examiner*—Christopher Mahoney
*Attorney, Agent, or Firm*—Finnegan, Henderson, Farabow, Garrett & Dunner, L.L.P.

[57] ABSTRACT

A camera in which a photographic data is recorded on a photographic film, includes a plurality of light emitting sections aligned in a direction perpendicular to a film advancing direction. The light emitting sections conducting exposure on a photographic image plane, have a plurality of light emitting elements, the wavelengths of light emitted by the light emitting elements are different. The camera further includes a memory for storing photographic information to be recorded on the film surface and a controller for selectively turning on and off the light emitting sections in the process of advancing the film in accordance with the information stored in the memory.

10 Claims, 14 Drawing Sheets

PHOTOGRAPHIC DATA RECORDING CAMERA

BACKGROUND OF THE INVENTION

The present invention relates to a photographic data recording camera in which photographic data including characters or marks is recorded on a film.

Japanese Patent Publication Open to Public Inspection No. 107632/1985 discloses a camera in which light emitting elements are turned on and off in the process of advancing a film by one frame after photographing, so that photographic data can be recorded on the frame. For example, these light emitting elements are composed of a plurality of LEDs that are one-dimensionally aligned in a direction perpendicular to the film advancing direction. When the film is fed, the respective LEDs are selectively turned on and off, so that desired characters or marks can be recorded on the film. FIG. 15 is a view showing an arrangement of light emitting elements of the prior art, wherein the view is taken from the light emitting side. As illustrated in the drawing, light emitting elements 101a to 101g including seven LED chips are one-dimensionally arranged, and the light emitting elements are connected on a light emitting element base board 109 so that each can emit light in a selective manner. Consequently, a light emitting section forming one dot on the film is composed of one chip of LED. In this connection, character A denotes an anode, and character K denotes a cathode.

Japanese Patent Publication Open to Public Inspection No. 256033/1991 discloses a camera having a rear-light detecting function. To be more specific, when it is judged that a photographic object is exposed with rear-light, the exposure time of photographic data is extended, or alternatively the recording time of photographic data is controlled in accordance with the result of detection of luminance of the photographic object at the recording position.

Japanese Patent Publication Open to Public inspection No. 107631/1985 discloses a camera in which the same photographic data is exposed by a plurality of lines of LEDs so that the deformation of a data image can be prevented even when a low-sensitivity film is used and the exposure time is extended.

The following is conventionally known: When a photographic object of the same color as that of the photographic data to be recorded is photographed at the recording position, the photographic data is not appropriately recorded on a photographic image plane, that is, the recorded photographic data disappears from the image plane. The reason why the recorded photographic data disappears is that the same color of the photographic object as that of the photographic data to be recorded is superimposed on the photographic data since the film is primarily composed of photosensitive layers of three colors. In order to overcome the above disadvantage, the wavelength of data recording light is set at a value so that the data recording light can be sensed by both green and red photosensitive sensitive layers which are two of the three photosensitive sensitive layers. Even if this countermeasure is taken, when the photographic object is in the same color, the photographic recording data image also disappears.

Consequently, even in the apparatus disclosed in Japanese Patent Publication Open to Public Inspection No. 256033/1991, in the case where the color of a photographic object is the same as that of the photographic data image to be recorded, the aforementioned problems can not be solved.

The above problems are caused in the following circumstances. Films are provided with photosensitive layers of three colors. However, the conventional light emitting section in which one LED forms one dot emits rays of light of a single color. Therefore, the photographic data can be only recorded on the photosensitive layers, the number of which is two at most.

According to Japanese Patent Publication Open to Public Inspection No. 107631/1985, disadvantages with respect to a low-sensitivity film can be effectively overcome, however, it is impossible to solve the problems for the color of the photographic object described above. Further, as described in the example of Japanese Patent Publication Open to Public Inspection No. 107631/1985, when the photographic data is recorded from the reverse side of the film, only the green and red sensitive layers can be exposed since yellow filter is provided on a negative photographic film.

SUMMARY OF THE INVENTION

The first embodiment of the present invention is a camera comprising:

a film advancing means for advancing a film;

a plurality of light emitting sections aligned in a direction perpendicular to the film advancing direction, the light emitting sections conducting exposure on a photographing image plane, the light emitting section having a plurality of light emitting elements, the wavelengths of light emitted by the light emitting elements being different;

a memory means for storing information to be recorded on the film surface; and a control means for selectively turning on and off the light emitting sections in the process of advancing the film in accordance with the information stored in the memory means.

The second embodiment of the present invention is composed in the following manner:

In the camera of the first embodiment, a plurality of light emitting sections, each light emitting section forming one dot of photographic data, are aligned in a direction perpendicular to the film advancing direction, and when the light emitting sections are selectively turned on and off in the process of advancing a film, photographic data is recorded on the film surface, wherein each light emitting section includes a plurality of light emitting elements, the wavelengths of emitted light of which are different.

The third embodiment of the present invention is composed in the following manner:

In the second embodiment, only the light emitting elements, the wavelengths of emitted light of which are the same, are aligned in a direction perpendicular to the film advancing direction, and only the light emitting elements, the wavelengths of emitted light of which are different, are aligned in the film advancing direction. In this way, a plurality of light emitting element lines are formed.

The fourth embodiment of the present invention is composed in the following manner:

In the second embodiment, a diffusion member is arranged on the light emitting surface side of each light emitting section.

In the photographic data recording camera of the second embodiment of the present invention, when one dot, which composes photographic data, is formed by a plurality of light emitting elements, the wavelengths of emitted light of which are different, at least one of the light emitting elements is capable of giving exposure onto the individual photosensitive layers of three colors. In accordance with the color of the photographic object at the data recording position, at least one of the plurality of light emitting elements, the wavelengths of emitted light of which are different, can be visually recognized. Therefore, irrespective of the color of the photographic object located at the photographic data recording position, the data recording image can be visually recognized.

In the photographic data recording camera of the third embodiment of the present invention, when one dot, which composes photographic data, is formed by conducting multi-exposure with a plurality of light emitting elements, the wavelengths of emitted light of which are different, exposure of the recording data image can be given to all photosensitive layers of three colors of the color film. Therefore, irrespective of the color of the photographic object located at the data recording position, the data image can be visually recognized. Further, when the configuration of the light emitting element is changed, images can be superimposed even if a small error is caused in light emitting control.

In the photographic data recording camera of the fourth embodiment of the present invention, when one dot, which composes photographic data, is formed by mixing colors of rays of light of the plurality of light emitting elements, the wavelengths of emitted light of which are different, using a light diffusing board, and when these rays of light are irradiated, the data recording image can be recorded on all photosensitive layers of three colors of the color film. In this way, the date recording image can be visually recognized.

DETAILED DESCRIPTION OF THE PREFERRED EMBODIMENT

With reference to FIGS. 1 to 14, the present invention will be explained in detail as follows.

Figure 1:
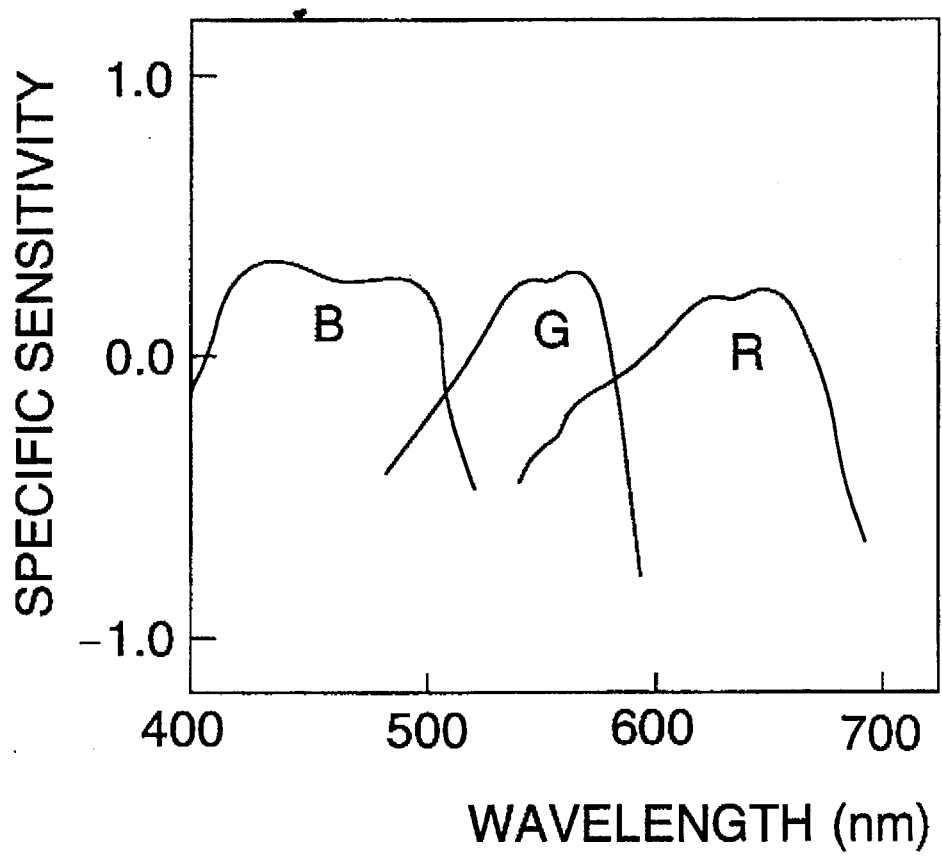
FIG. 1 is a graph showing an example of the spectral sensitivity distribution of a color film.

First, referring to FIG. 1, the fundamental concept of the present invention will be explained. FIG. 1 is a graph showing an example of the spectral sensitivity distribution of a color film.

In FIG. 1, B denotes a blue sensitivity layer, G denotes a green sensitivity layer, and R denotes a red sensitivity layer. The color film is based on these three colors. Therefore, the image of a photographic object is printed by six colors including single colors of B, G and R, and mixed colors of B and G (C: cyan), G and R (Y: yellow), and R and B (M: magenta).

For example, in the case where the wavelength of light emitted by the light emitting element for recording photographic data is sensitive only to a red sensitivity layer, when a photographic object located at the photographic data recording position is composed of a color sensitive to the red sensitivity layer such as R, mixed color (Y: yellow) of G and R, or mixed color (M: magenta) of R and B, the photographic data becomes invisible, or alternatively it becomes difficult to recognize the photographic data. Therefore, when this wavelength is used, the photographic data image can not be recognized with respect to three colors in the six colors.

In order to solve the above problem, the wavelength of the light emitting element is determined to be Y: yellow, which is a mixed color of G and R, so that the wavelength is sensitive to both G (green sensitivity layer) and R (red sensitivity layer). In this case, when the color of the photographic object located at the photographic data recording position is yellow, the photographic data image becomes invisible, that is, when this wavelength is used, the photographic data image can not be recognized with respect to one color in the six colors. In this case, although the circumstances are improved as compared with the conventional case, the countermeasure is not perfect.

As can be seen from the foregoing, it is clear that the wavelength of emitted light must be determined to be sensitive to each of B, G and R. However, the wavelength of light emitted by a conventional LED is a single wavelength. Therefore, it is impossible to give exposure to all photosensitive layers.

Figure 2:
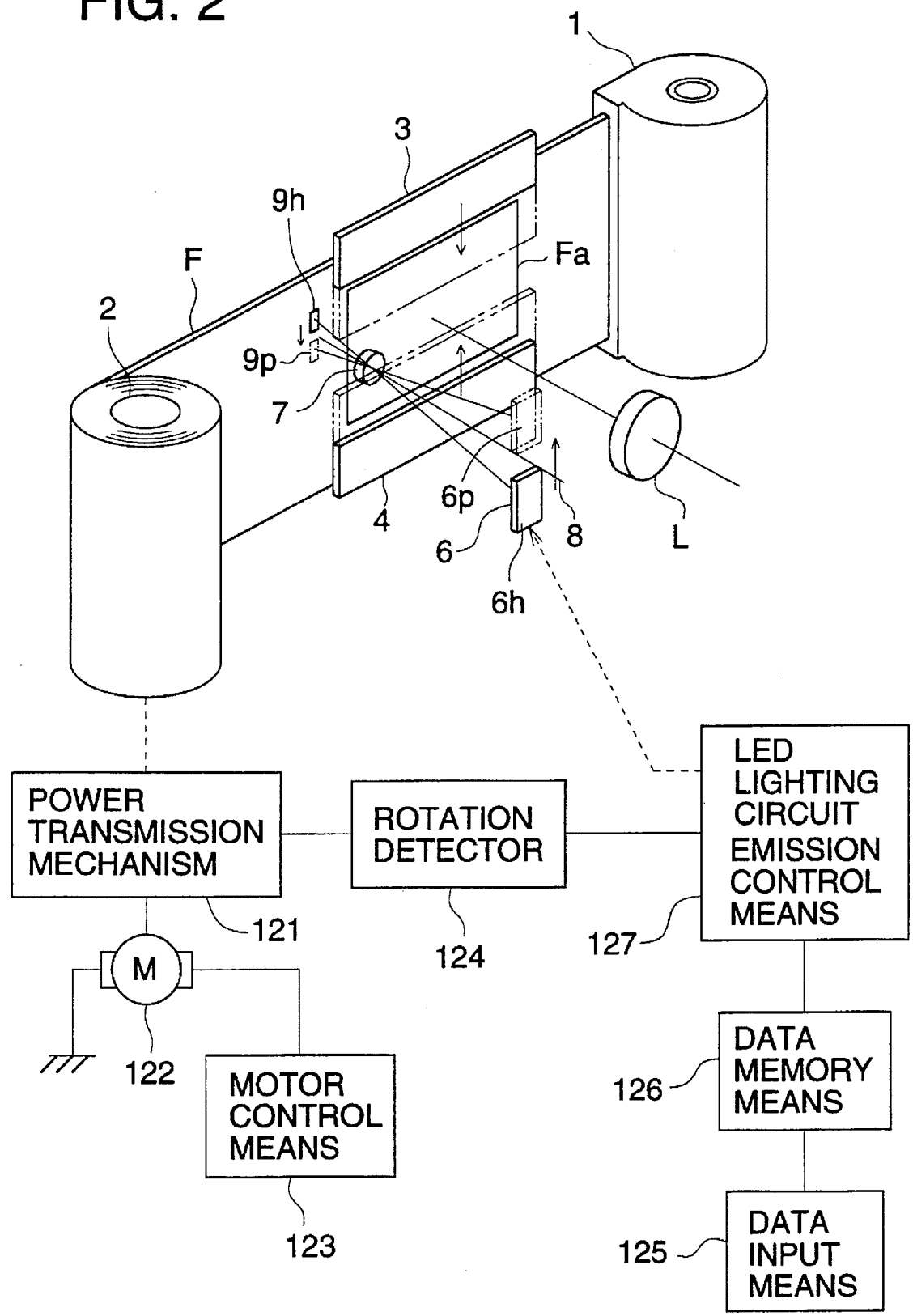
FIG. 2 is a schematic illustration showing the inside of a photographic data recording camera in which the image plane size can be changed.
Figure 3:
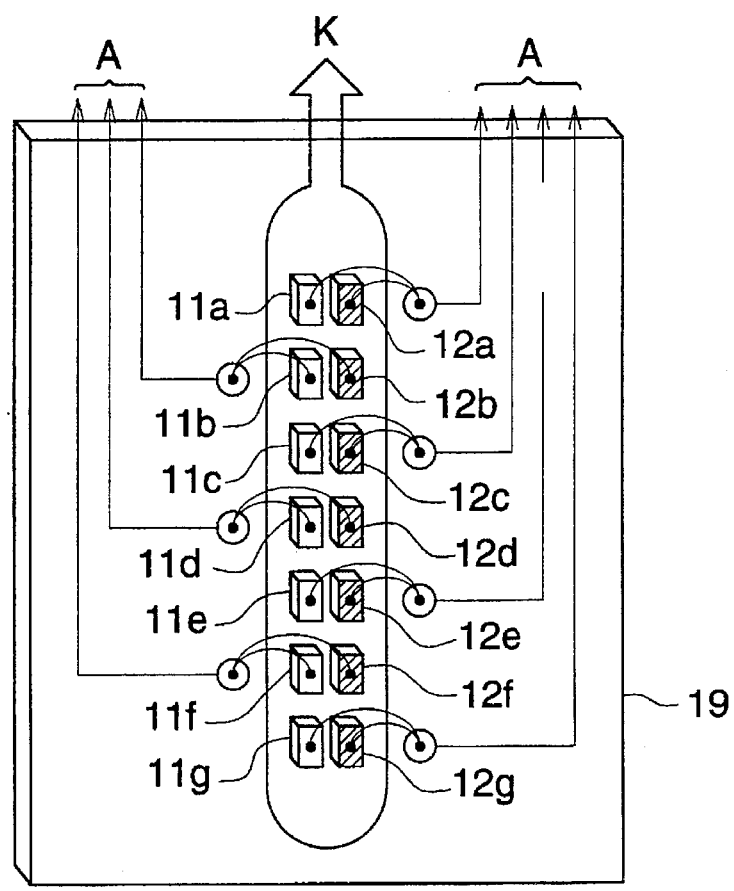
FIGS. 3 (A) and 3 (B) are views showing the apparatus of the first example.
Figure 3:
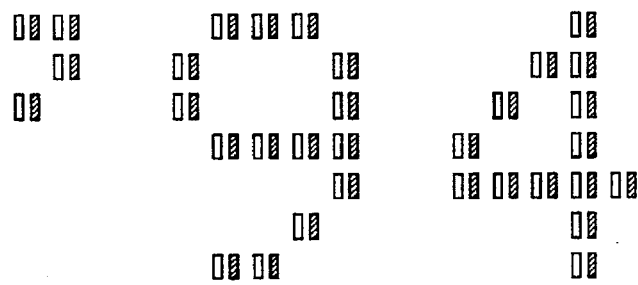
Figure 4:
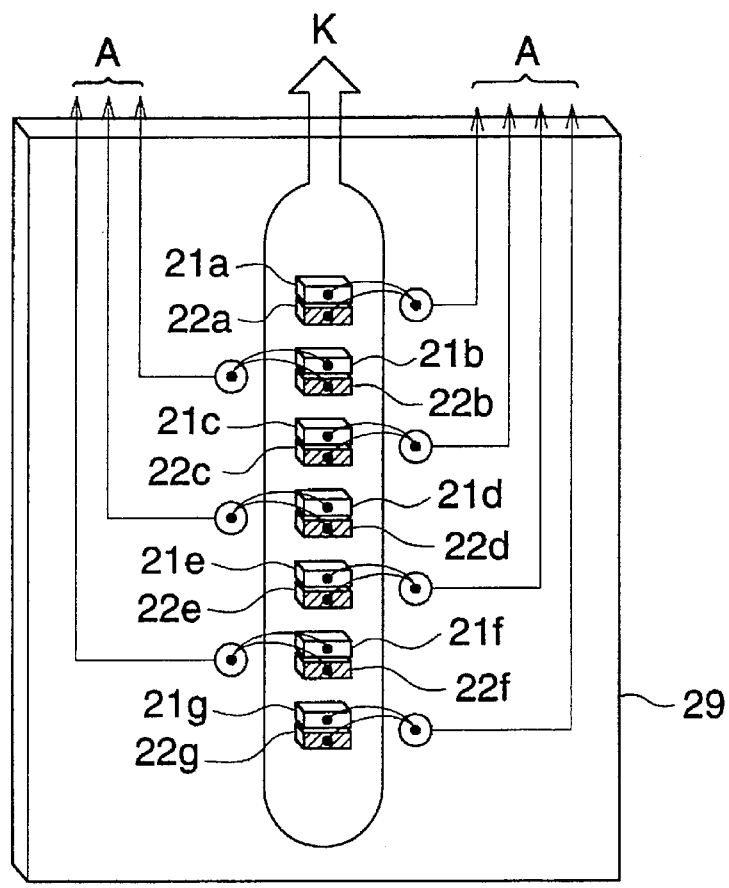
FIGS. 4 (A) and 4 (B) are views showing the apparatus of the second example.
Figure 4:
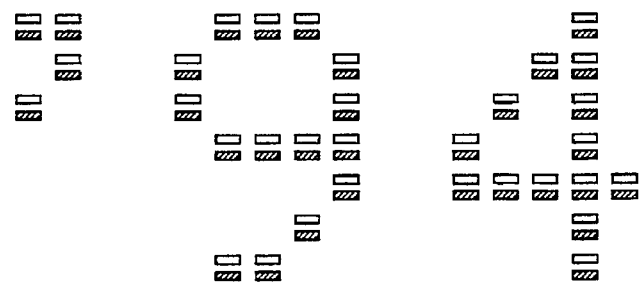
Figure 5:
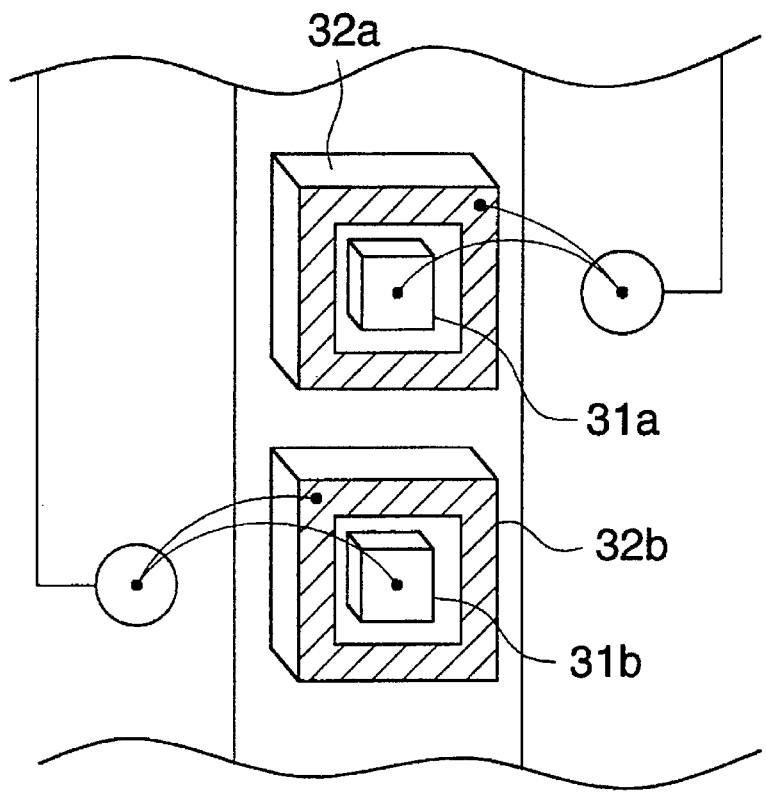
FIGS. 5 (A) and 5 (B) are views showing the apparatus of the third example.
Figure 5:
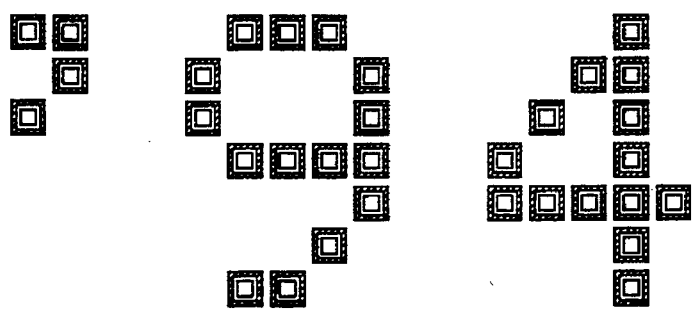
Figure 6:
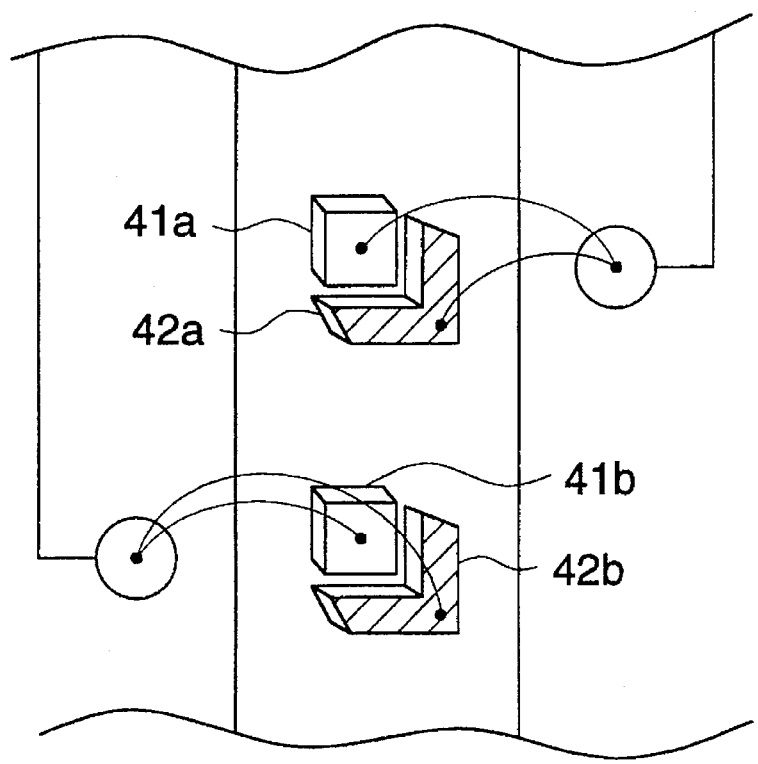
FIGS. 6 (A) and 6(B) are views showing the apparatus of the fourth example.
Figure 6:
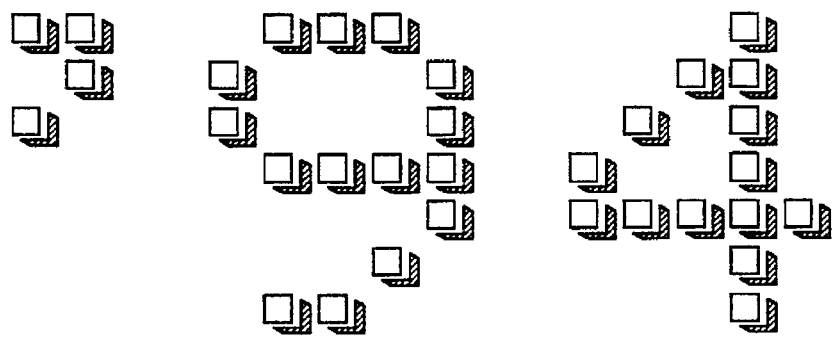
Figure 7:
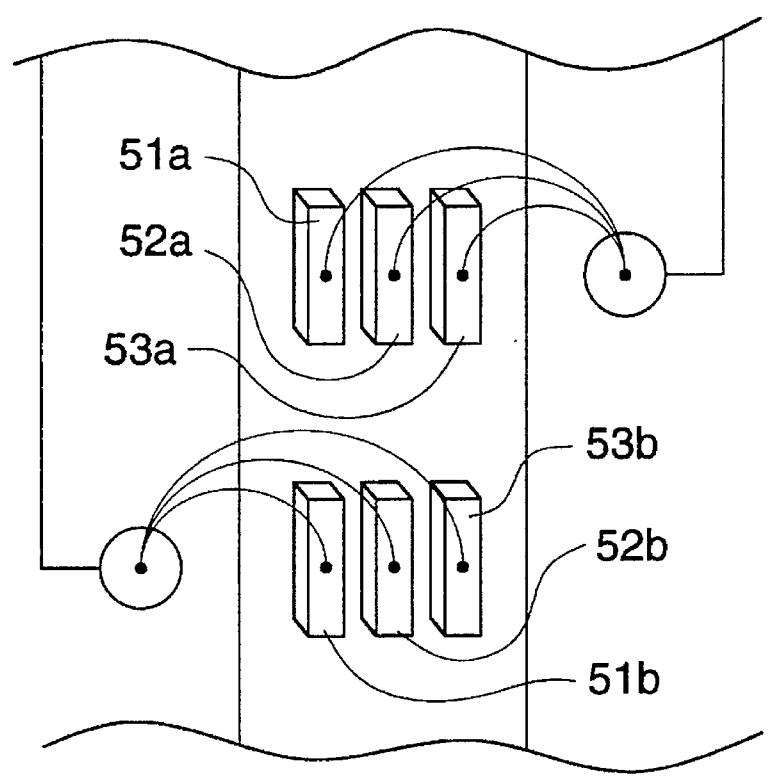
FIGS. 7 (A) and 7 (B) are views showing the apparatus of the fifth example.
Figure 7:
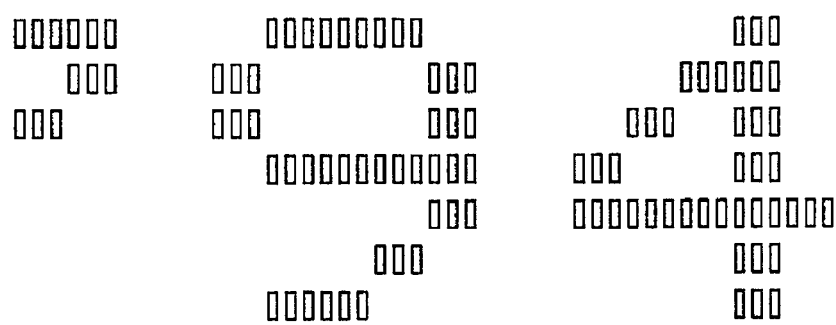

FIG. 2 is a schematic illustration showing the inside of a photographic data recording camera in which the image plane size can be changed.

In the drawing, operation is carried out as follows. Film F is pulled out from a film magazine 1 and wound around a reel 2 after one frame has been photographed. When the image plane is set to be a standard size of 24 mm×36 mm, light shading plates 3, 4 are withdrawn upward and downward. Therefore, image plane Fa of the standard size is photographed by picture-taking lens L. When the image plane is set to be a panoramic size of 13 mm×36 mm, the light shading plates 3, 4 are moved to the center as illustrated by two-dotted chain lines in the drawing so that the short side of the image plane is reduced and a transversely long panoramic image plane can be formed.

Next, the photographic data recording device is explained below. The photographic data recording device of the present invention is composed in the following manner. While the film F is advancing when one frame of the film is wound around the reel 2 after photographing, light emitting elements are turned on and off, so that the photographic data composed of numerals and alphabets are recorded on the frame. In the case of photographing of the standard size, a light emitting element 6 for recording photographic data is arranged at a position 6h under the optical axis 8 of the photographic data recording system 7. By the light emitting element 6, the photographic data image is formed at a photographic data recording position 9h on the film F through the photographic data recording optical system 7. On the other hand, in the case of photographing of panoramic size, the light shading plates 3, 4 are changed over, and at the same time, the light emitting element 6 is moved upward to an upper position 6p which is symmetrically located with respect to the optical axis 8. Then the photographic data image is formed at a photographic data recording position 9p on the film F through the photographic data recording optical system 7 in the same manner.

The reason why the image forming position of the light emitting element 6 is moved in accordance with the image plane size will be described as follows:
When the photographic data recording position is fixed at the position 9h, the photographic data image is recorded at a position outside the image plane in the case of the panoramic size. When the photographic data recording position is fixed at the position 9p, the photographic data image is recorded at a position close to the center of the image plane in the case of the standard size. In order to avoid the inconvenience, the image forming position of the light emitting element 6 is moved in accordance with the image plane size. Of course, the light emitting element 6 and the photographic data recording optical system 7 are arranged at positions distant from the luminous flux of the photographing optical system.

The control method of photographic data recording may be the same as that disclosed in Japanese Patent Publication Open to Public Inspection No. 107631/1985. Photographic data to be recorded is inputted by an input means 125 and stored in a data memory means 126. In accordance with the output of a rotation detector 124 which outputs a signal corresponding to the feed of a film, the control of photographic data recording is effected by the LED lighting circuit and the light emitting control means 127. The rotation detector 124 detects a rotational angle of the rotational member corresponding to the advance of the film in a power transmission mechanism 121.

The first to fifth examples are shown in FIGS. 3(A) to 7(B). In these examples, each light emitting section composing one dot of characters and marks to be recorded is further divided, and the wavelengths of light to be emitted are made to be different. In this way, the wavelengths of emitted light are determined so that the photographic data image can be recorded on all photosensitive layers of B, G and R. In this way, the above problems are solved.

FIGS. 3(A) and 3(B) are views showing the first example of the present invention. FIG. 3(A) is a View showing a line of the light emitting elements, and FIG. 3(B) is a view showing photographic data recorded by the light emitting element illustrated in FIG. 3(A).

Figure 15:
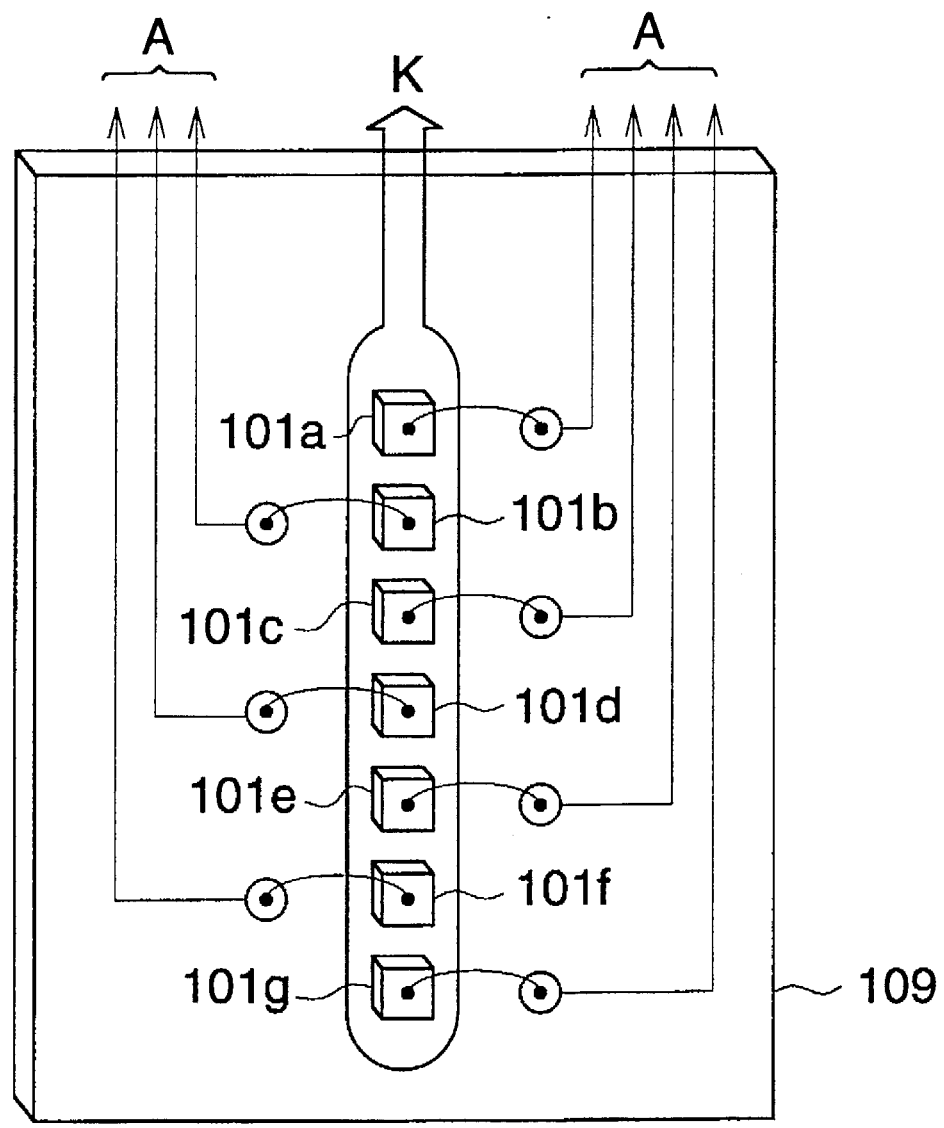
FIG. 15 is a view showing the conventional light emitting element.

This example is different from the conventional example illustrated in FIG. 15. In this example, the light emitting section corresponding to one dot is divided into two, one is right and the other is left. In this example, pairs of LEDs are provided such as 11a and 12a, 11b and 12b, . . . , 11g and 12g. These light emitting elements are aligned in a direction perpendicular to the film feed direction. Light emitting elements of each pair are connected by a lead on the light emitting element base board 19 so that each pair of light emitting elements can emit light simultaneously. In this connection, character A denotes a anode, and character K denotes a cathode. The wavelength of emitted light of each light emitting element in the light emitting element line 11a to 11g is different from the wavelength of emitted light of each light emitting element in the light emitting element line 12a to 12g. For example, in the light emitting element line 11a to 11g, light emitting elements, the wavelengths of which are sensitive to both blue and green photosensitive layers (for example, about 500 nm), are used. In the light emitting element line 12a to 12g, light emitting elements, the wavelengths of which are sensitive to both green and red photosensitive layers (for example, about 580 nm), are used. In each light emitting element line, the wavelengths of emitted light of the light emitting elements must be the same. In this case, the right and left may be reversed.

Concerning the wavelengths of emitted light of the two lines of light emitting elements, as described above, it is an object to sensitize the three photosensitive layers on the film. Therefore, the wavelengths are not limited to the specific values described above, but the wavelength of emitted light sensitive to both the blue and green photosensitive layers and the wave length of emitted light sensitive only to the red photosensitive layer may be combined. Alternatively, the wavelength of emitted light sensitive to both the green and red photosensitive layers and the wavelength of emitted light sensitive only to the blue photosensitive layer may be combined.

As described above, light emitting element lines composed of LED arrays are used, and pairs of light emitting elements are selectively turned on and off in the process of feeding a film, so that photographic data can be recorded on the film. The control method of data recording is the same as that of the prior art because each pair of light emitting elements (for example 11a and 12a) can be controlled in the same manner as that of one piece of the conventional LED chip. Therefore, the explanation of the control method is omitted here.

FIG. 3(B) is an enlarged view of photographic data recorded by the light emitting element. In FIG. 3(B), one dot is composed of a pair of dots, one is a plain dot and the other is a hatched dot. Characters and marks are denoted by the dots described above.

When one dot is composed of a pair of dots, one is a plain dot and the other is a hatched dot as described above, a photographic data image can be visually recognized even if a photographic object of any color is located at the photographic data recording position. For example, when a photographic object of blue, green or cyan is located at the photographic data recording position, one of the pair of dots is invisible since it is on the blue or green photosensitive layer, and the other of the pair of dots is visible since it is sensitive to the red photosensitive layer. Therefore, the photographic data is finally left and visualized. On the contrary, when a red, green or yellow photographic object is located at the photographic data recording position, one of the dots sensitive to the red and green photosensitive layers is invisible, however, the other dot is sensitive to the blue photosensitive layer. Therefore, the photographic data image can be visually recognized in the same manner as described above. Accordingly, even if a photographic object of any color is located at the photographic data recording position, the photographic data image can be visually recognized.

In this connection, in FIG. 3(B), depending upon the color of a photographic object located at the photographic data recording position, there are provided two cases. One is a case in which both the plain dot and hatched dot can be visually recognized. The other is a case in which only one of the dots can be visually recognized. In both cases, the photographic data image can be visually recognized.

FIGS. 4(A) and 4(B) are views showing the apparatus of the second example of the present invention. FIG. 4(A) is a view showing a line of the light emitting elements, and FIG.

4(B) is a view showing photographic data recorded by the light emitting element illustrated in FIG. 4(A).

In the first example, the light emitting section is transversely divided into 2 portions, one is right and the other is left. On the other hand, in this example, the light emitting section is divided longitudinally as illustrated in FIG. 4(A), that is, the light emitting section is divided in such a manner that 21a and 22a, 21b and 22b, ... , and 21g and 22g. The pair of light emitting elements are connected by a leading wire on the on the light emitting element base board 29 so that the pair of light emitting elements can emit light simultaneously. Wavelengths of light emitted by the pair of light emitting elements are made to be different. Wavelengths of light emitted by the light emitting elements 21a to 21g and wavelengths of light emitted by the light emitting elements 22a to 22g are determined in the same manner as that of the first example. In the photographic data image shown in FIG. 4(B), a dot of two colors is divided upward and downward. Therefore, the same effect as that of the first example can be provided.

FIGS. 5(A) and 5(B) are views showing the third example of the present invention. FIG. 5(A) is an enlarged view of the light emitting element composing a portion of the light emitting section. FIG. 5(B) is a view showing the photographic data recorded by the light emitting element shown in FIG. 5(A). In the same manner as that of the first example, the wavelengths of light emitted by the light emitting elements 31a to 31b are different from those of the light emitting elements 32a to 32b. Other points are the same as those of the first example.

FIGS. 6(A) and 6(B) are views showing the fourth example of the present invention. FIG. 6(A) is an enlarged view of the light emitting element composing a portion of the light emitting section. FIG. 6(B) is a view showing the photographic data recorded by the light emitting element shown in FIG. 6(A). In the same manner as that of the first example, the wavelengths of light emitted by the light emitting elements 41a to 41b are different from those of the light emitting elements 42a to 42b. Other points are the same as those of the first example.

FIGS. 7(A) and 7(B) are views showing the fourth example of the present invention. FIG. 7(A) is an enlarged view of the light emitting element composing a portion of the light emitting section. FIG. 7(B) is a view showing the photographic data recorded by the light emitting element shown in FIG. 7(A). In this example, one dot is divided into three portions of 51a to 51b, 52a to 52b and 53a to 53b. On these three lines, LEDs of wavelengths in the bands sensitive to the blue, green and red photosensitive layers are respectively used. Other points are the same as those of the first example.

FIGS. 8 to 12 are views showing the sixth to eighth examples of the present invention. In these examples, one dot of photographic data is subjected to multi-exposure by the light emitting elements of different wavelengths. Due to the foregoing, all color layers of the color film are exposed to light, so that the photographic data image can be visually recognized at the recording position in the background.

Figure 8:
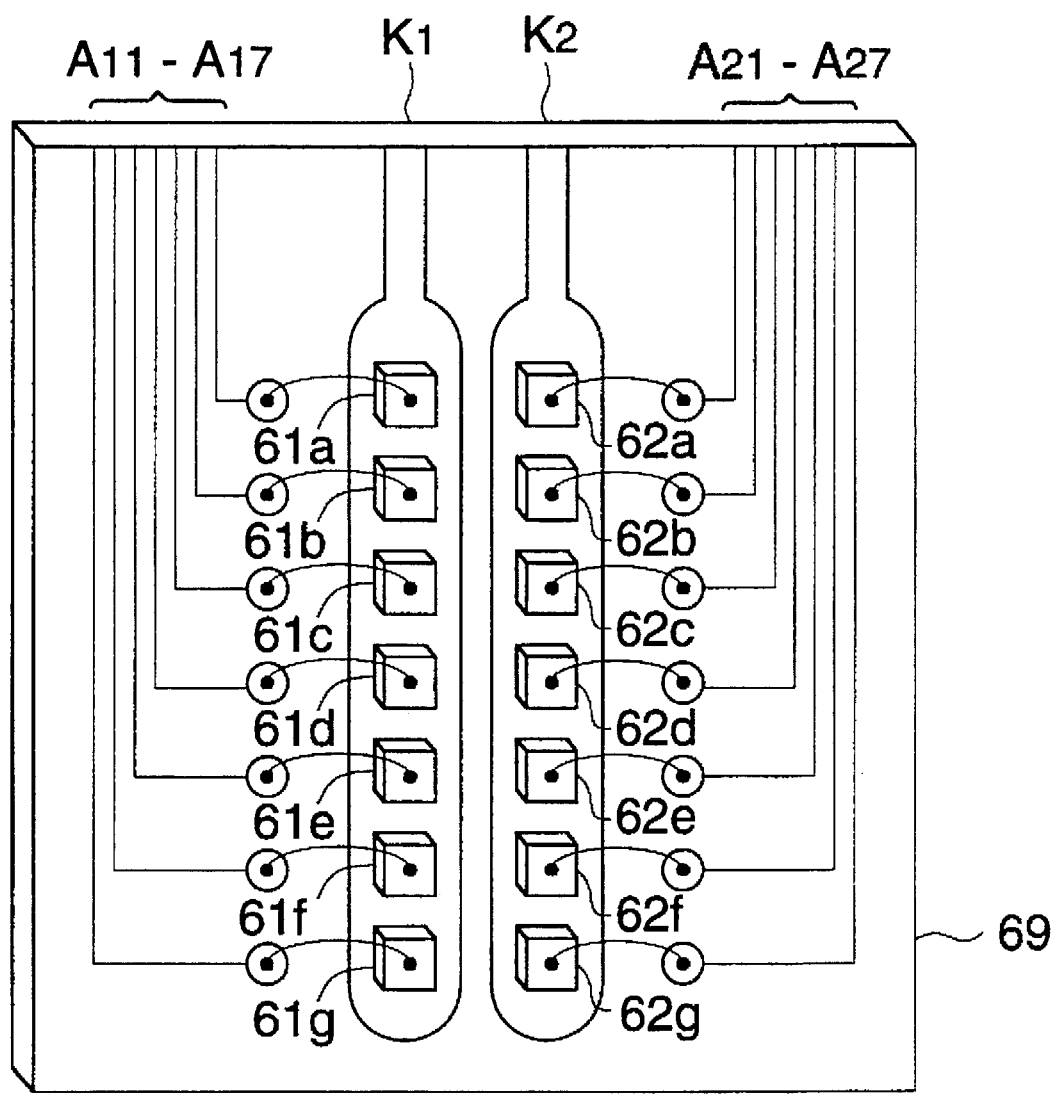
FIG. 8 is a plan view of showing an arrangement of the lines of light emitting elements 6f the sixth example of the present invention.

FIG. 8 is a view showing lines of the light emitting elements used for the sixth example. FIG. 8 is a view of the light emitting member 6 illustrated in FIG. 2, wherein the view is taken from the light emitting section side. The light emitting element line composed of 7 LEDs 61a to 61g and the light emitting element line composed of 7 LEDs 62a to 62g are capable of emitting light individually. Therefore, the light emitting elements 61a to 61g are connected on the light emitting element base board 69 so that they can be driven by cathodes $K_1$ and anodes $A_{11}$ to $A_{17}$. Also, the light emitting elements 62a to 62g are connected on the light emitting element base board 69 so that they can be driven by cathodes $K_2$ and anodes $A_{21}$ to $A_{27}$. Further, the light emitting elements 61a and 62a to 61g and 62g respectively make pairs. They are arranged in parallel with the film feed direction.

In this case, the wavelengths of LEDs are determined in such a manner that the wavelength of the light emitting element line 61a to 61g is different from that of the light emitting element line 62a to 62g. For example, the wavelength of LED used for the light emitting element line 61a to 61g is determined in such a manner that both the blue and green photosensitive layers are sensitive to the wavelength of emitted light, for example, the wavelength is determined to be approximately 500 nm. The wavelength of LED used for the light emitting element line 62a to 62g is determined in such a manner that both the green and red photosensitive layers are sensitive to the wavelength of emitted light, for example, the wavelength is determined to be approximately 580 nm.

An object of the wavelengths of the two light emitting element lines is to sensitize the three photosensitive layers on the film. Accordingly, the combination of the wavelengths of the two light emitting element lines is not limited to the above. A combination of the wavelength sensitive to both the blue and green photosensitive layers with the wave length sensitive only to the red photosensitive layer may be employed. Alternatively, a combination of the wavelength sensitive to both the green and red photosensitive layers with the wave length sensitive only to the blue photosensitive layer may be employed.

Figure 9:
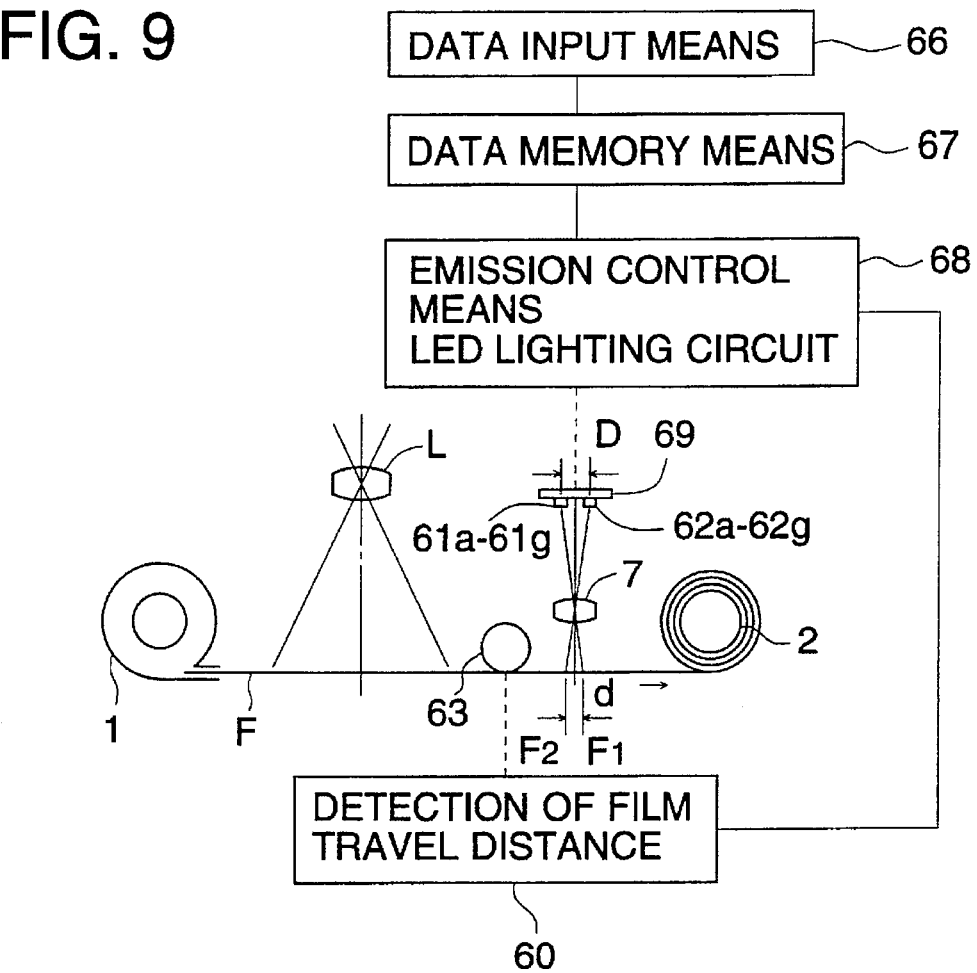
FIG. 9 is a transverse sectional view of the photographic data recording camera to which the sixth example is applied.

FIG. 9 is a transverse cross sectional view of the photographic data recording camera to which the sixth example of the present invention is applied.

Character L is a photographic lens. Numeral 1 is a film magazine. Numeral 2 is a reel. Numeral 7 is an optical system for recording photographic data. The light emitting element lines 61a to 61g and 62a to 62g shown in FIG. 8 are provided on the base board 69 while the two light emitting element lines are spaced from each other by the distance D apart. Images of light emitting lines are formed at the positions $F_1$ and $F_2$ on the film F by the data recording optical system 7. In this case, the positions $F_1$ and $F_2$ are spaced by the distance d apart. The light emitting element lines 61a to 61g and 62a to 62g are subjected to multiexposure in the following manner. A selected light emitting element, for example, the light emitting element 62b on the light emitting element line 62a to 62g emits light so that the photographic data is recorded at the position $F_2$ on the film F. After that, the film F is moved by the distance d. At the position $F_1$, a light emitting element at the same position, for example, the light emitting element 61b on the light emitting element line 61a to 61g emits light.

Figure 10:
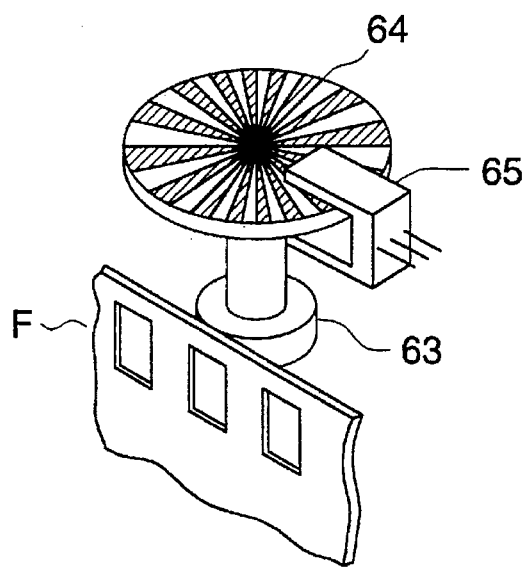
FIG. 10 is a perspective view of the film feed amount detecting mechanism.

Traveling distance of the film F is detected by the film roller 63. The film traveling distance detecting mechanism is illustrated in FIG. 10. As shown in the drawing, rotation of the roller 63 is transmitted to a film-shaped rotary disk 64 or a propeller-shaped member formed into a pattern in which transparent portions and opaque portions are alternately provided, so that the rotation of the rotary disk 64 is detected by the photo-interrupter 65. Alternatively, the rotary disk 64 may be provided with a pattern in which reflecting portions and non-reflecting portions are alternately provided, and the detection may be effected by a photo-reflector.

Referring to FIG. 9, photographic data to be recorded is inputted through the data input means 66. The inputted data is stored in the memory means 67. While the film travel is being momentarily detected by the film traveling detecting means 60, the light emission control means and the LED lighting circuit 68 conduct multi-exposure in accordance with the data stored in the memory means 67.

Due to the foregoing, the data image recorded on the film is composed of a mixed color of the wavelengths of the two lines of LED. Therefore, the photosensitive layers of the primary three colors on the film are exposed to light, so that the formed data image can be visually recognized at the photographic data recording position.

Figure 11:
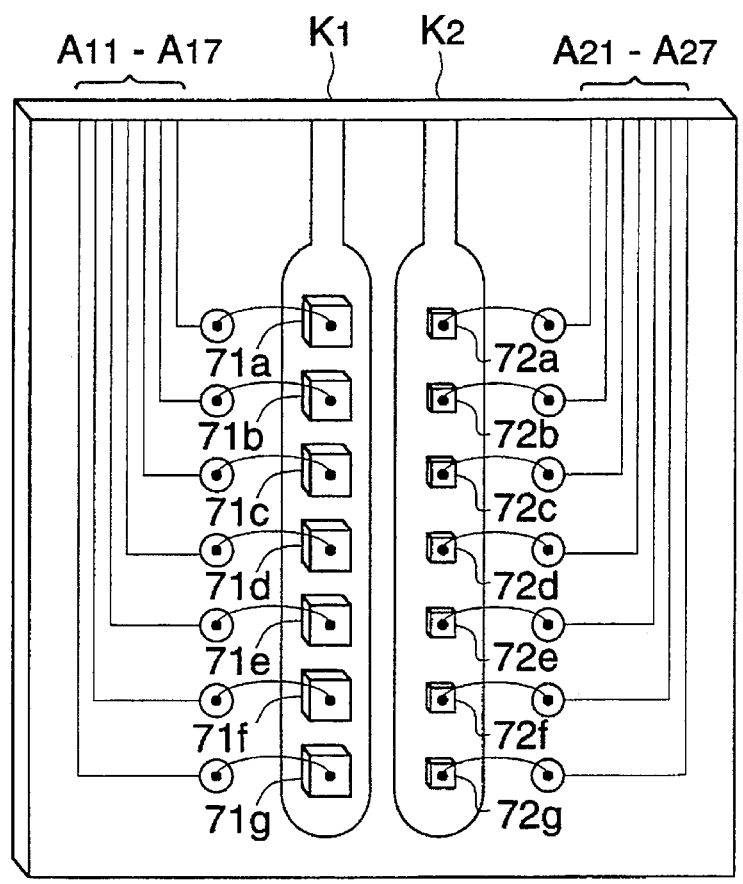
FIGS. 11 (A) and 11 (B) are views showing the apparatus of the seventh example.
Figure 11:
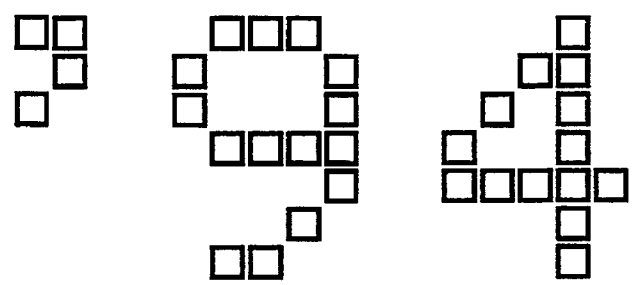

FIGS. 11(A) and 11(B) are views of the seventh example of the present invention. FIG. 11(A) is a view showing the light emitting element line, and FIG. 11(B) is a view of data recorded by the light emitting elements illustrated in FIG. 11 (A).

The wavelength of the light emitting element line 71a to 71g is different form the wavelength of the light emitting element line 72a to 72g, and further the dimensions of the light emitting element of the line 71a to 71g are different from the dimensions of the light emitting element of the line 72a to 72g. On the data image illustrated in FIG. 11(B), a white central portion is reproduced through multi-exposure by a mixed color of the wavelengths of the light emitting element lines 71a to 71g and 72a to 72g. The black periphery is exposed to light only by the light emitting element line 71A to 71g.

Figure 12:
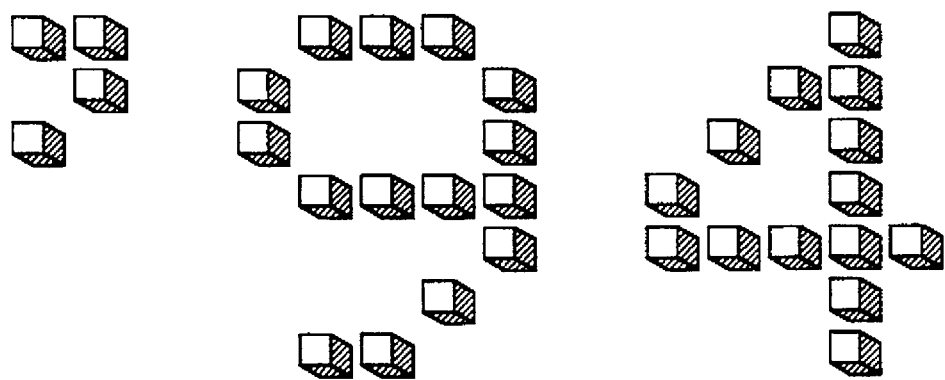
FIG. 12 is a view showing the photographic data recorded in the eighth example.
Figure 13:
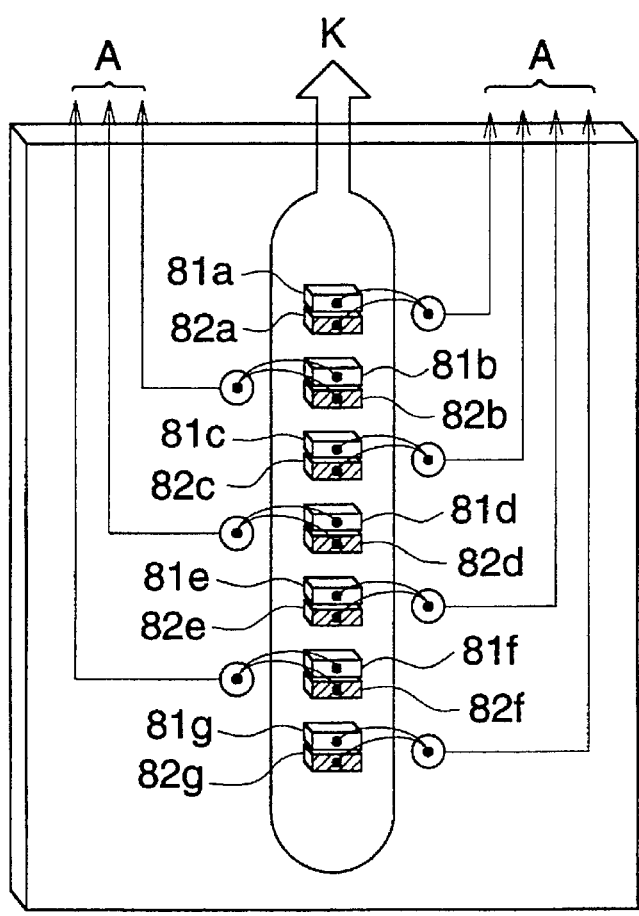
FIGS. 13 (A) and 13 (B) are views showing the apparatus of the ninth example.
Figure 13:
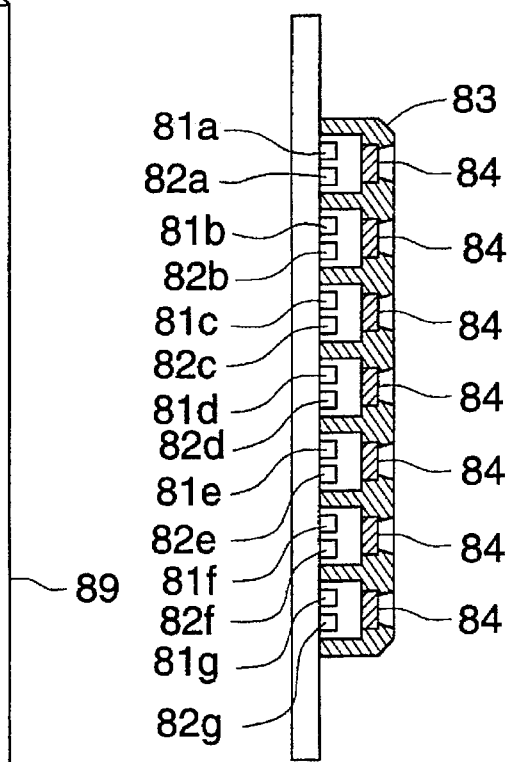

The eighth example is composed in such a manner that the light emitting element line 72a to 72g is shifted to a left upper position and the light emitting element line 71a to 71g is formed to be hexagonal and multi-exposure is employed. FIG. 12 is a view showing the recorded data image. In the same manner as that of the seventh example, a white portion is composed of a mixed color, and a black portion is exposed only by the light emitting element line 71a to 71g.

Further, three lines of light emitting element lines may be provided, and wavelengths may be determined so that only the blue, green and red photosensitive layers on the film can be sensitized.

Figure 14:
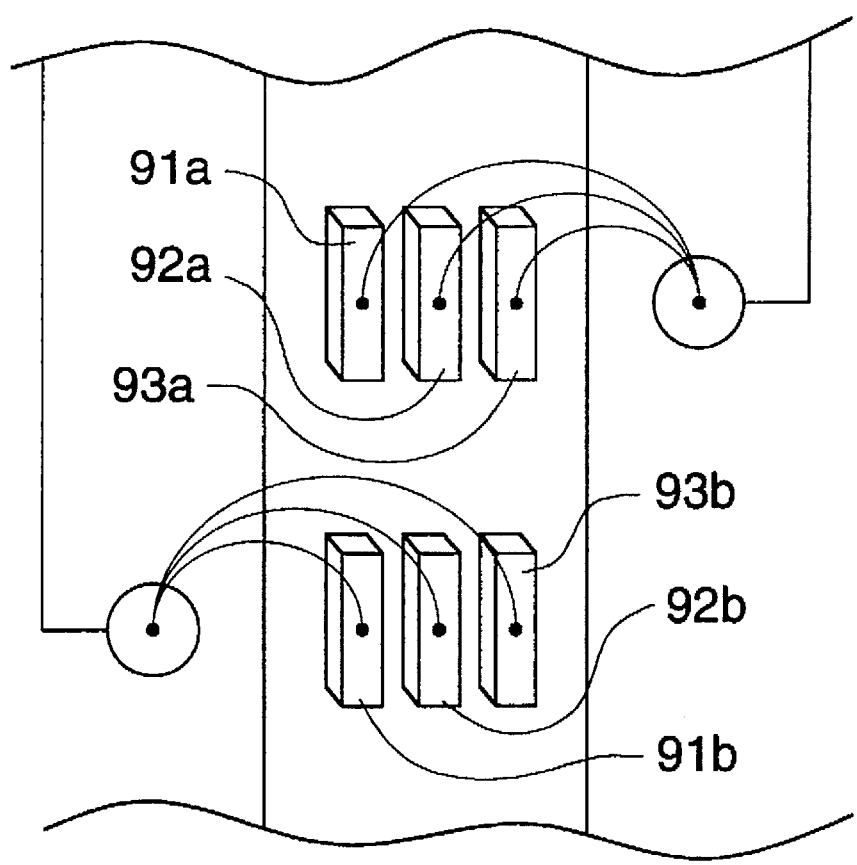
FIGS. 14 is a view showing the apparatus of the tenth example.

FIGS. 13(A), 13(B) and 14 show the ninth and tenth examples of the present invention. In these example, rays of light of a plurality of light emitting elements, the wavelengths of emitted light of which are different, are mixed with a diffusion board, and this diffusion board is used as the secondary light source. In this way, the photographic data is recorded on all the photosensitive layers of three colors on the film. Therefore, the data image can be visually recognized at the recording position in the background.

FIGS. 13(A) and 13(B) are views showing the ninth example of the present invention. FIG. 13(A) is a view sowing the light emitting element line, and FIG. 13(B) is the longitudinal cross sectional view. The ninth example is composed in the same manner as that of the second example. That is, as shown by 81a, 82a to 81g, and 82g, the light emitting section is divided into an upper and a lower portion, and a pair of the portions are connected to the wiring on the light emitting element base plate 89 so that the pair of the light emitting portions can emit light simultaneously. Wavelengths of the light emitting elements composing the pair are different from each other. Wavelengths of light emitted by 81a to 81g and 82a to 82g are determined in the same manner as that of the first example.

In FIG. 13(B), numeral 83 is a light shielding member, and numeral 84 is a diffusing board. The diffusing board 84 is individually attached to an upper position of the light emitting element. The light shielding member 83 holds the diffusing board 84. At the same time, the light shielding member 83 forms a boundary of the LED. This boundary is provided for the prevention of stray light. When the diffusing board is used, it is necessary to provide the light shielding member to be used as the boundary.

Due to the foregoing structure, each pair of light emitting elements simultaneously emit light of different wavelengths. Rays of emitted light of different wavelengths are mixed by the diffusing board. Therefore, it appears that rays of light of mixed color are emitted from the light emitting element composed of LED. That is, it is assumed that the diffusing board 84 is a secondary light source, and the diffusing board 84 is focused by the optical system 7 for recording photographic data shown in FIG. 2. Under the above condition, exposure is conducted on the film F. Using the same control method as that of the first invention, the light emitting element array described above is employed and selectively turned on and off so as to record the photographic data image on the film.

Due to the foregoing, the photographic data image is recorded on all the photosensitive layers of the three primary colors on the film. Therefore, irrespective of the color of a photographic object at the data recording position, the data image can be visually recognized.

The configuration of the diffusing board may be circular and rectangular. Further, it maybe any arbitrary shapes irrespective of the configuration of the light emitting element. In general, the diffusing board 84 is made of opal glass.

In this example, a pair of light emitting elements are arranged in the upward and downward direction. However, they may be arranged in the transverse direction.

FIG. 14 is a view showing the tenth example of the present invention. In this example, only a portion of the light emitting section is enlarged. The light emitting section corresponding to one dot is divided into three portions. The light emitting elements of wavelengths respectively sensitive to the blue, green and red photosensitive layers on the film are provided on the line 91a and 91b, the line 92a and 92b, and the line 93a and 93b. It is possible to provide the same effect as described above when the light shielding member and the diffusing board are arranged in the same manner as that of the ninth example.

According to the photographic data recording camera of the present invention, irrespective of the color of a photographic object located at the photographic data recording position, the recorded data image can be visually recognized. Therefore, it is not necessary to provide a specific light emitting control device, and further it is not necessary to measure the luminance of the photographic object at the data recording position, and a data image of high quality can be provided.

What is claimed is:

1. A camera in which photographic data is recorded on a photographic film, comprising:

(a) an advancing means for advancing the photographic film;

(b) a plurality of light emitting sections aligned in a direction perpendicular to a film advancing direction and parallel to a photographic image plane of the film for exposing the photographic image plane of the film to form respective dots for the photographic data, each of said plurality of light emitting sections having a plurality of light emitting elements, each of said plurality of light emitting elements including a light emitting surface facing the photographic image plane, wavelengths of light emitted by said plurality of light emitting elements being different;

(c) memory means for storing the photographic data to be recorded at the photographic image plane; and (d) control means for turning on and off simultaneously said plurality of light emitting elements having said different wavelengths and belonging to selected ones of said plurality of light emitting sections in accordance with the data stored in said memory means while advancing the film by one frame, said different wavelengths being Sufficiently different to avoid disappearance of a portion of said data on account of like color superposition.

2. The camera of claim 1, wherein a first plurality of said pluralities of light emitting elements in said plurality of light emitting sections have the same light emitting wavelength and are aligned in the direction perpendicular to the film advancing direction and parallel to the photographic image plane, and a second plurality of said pluralities of light emitting elements in said plurality of light emitting sections have differing light emitting wavelengths and are aligned in the film advancing direction.

3. The camera of claim 1, wherein a first plurality of said pluralities of light emitting elements in said plurality of light emitting sections have a first light emitting wavelength and are aligned in the direction perpendicular to the film advancing direction and parallel to the photographic image plane, and a second plurality of said pluralities of light emitting elements in said plurality of light emitting sections have a second light emitting wavelength different from said first light emitting wavelength and are aligned in the direction perpendicular to the film advancing direction and parallel to the photographic image plane and aligned and alternated with said first plurality.

4. The camera of claim 1, wherein each of said plurality of light emitting sections includes a first light emitting element having a first light emitting wavelength and a second light emitting element having a second light emitting wavelength different from said first light emitting wavelength, said second light emitting element at least partially surrounding said first light emitting element.

5. A camera in which photographic data is recorded on a photographic film, comprising:

(a) an advancing means for advancing the photographic film;

(b) a plurality of light emitting sections aligned in a direction perpendicular to a film advancing direction and parallel to a photographic image plane of the film for exposing the photographic image plane of the film to form respective dots for the photographic data, each of said plurality of light emitting sections having a plurality of light emitting elements, each of said plurality of light emitting elements including a light emitting surface facing the photographic image plane, wavelengths of light emitted by said plurality of light emitting elements being different;

(c) memory means for storing the photographic data to be recorded at the photographic image plane; and (d) control means for turning on and off simultaneously said plurality of light emitting elements having said different wavelengths and belonging to selected ones of said plurality of light emitting sections in accordance with the data stored in said memory means while advancing the film by one frame, wherein a first plurality of said pluralities of sight emitting elements in said plurality of light emitting sections have a first light emitting wavelength and are aligned in the direction perpendicular to the film advancing direction and parallel to the photographic image plane, and a second plurality of said pluralities of sight emitting elements in said plurality of light emitting sections have a second light emitting wavelength different from said first light emitting wavelength, said first and second sight emitting wavelengths being sufficiently different to avoid disappearance of a portion of said data on account of the color superposition, said second plurality being aligned in the direction perpendicular to the film advancing direction and parallel to the photographic image plane and aligned and alternated with said first plurality, and further comprising:

a diffusing board provided on an upper portion of each of said plurality of light emitting sections for mixing light emitted from said plurality of light emitting elements; and a light shielding member for holding said diffusion board and for blocking stray light from adjoining ones of said plurality of sections.

6. A camera in which photographic data is recorded on a photographic film, comprising:

(a) an advancing means for advancing the photographic film;

(b) a plurality of light emitting sections aligned in a direction perpendicular to a film advancing direction and parallel to a photographic image plane of the film for exposing the photographic image plane of the film to form respective dots for the photographic data, each of said plurality of light emitting sections having a plurality of light emitting elements, each of said plurality of light emitting elements including a light emitting surface facing the photographic image plane, wavelengths of sight emitted by said plurality of light emitting elements being different;

(c) memory means for storing the photographic data to be recorded at the photographic image plane; and (d) control means for turning on and off simultaneously said plurality of sight emitting elements having said different wavelengths and belonging to selected ones of said plurality of light emitting sections in accordance With the data stored in said memory means while advancing the film by one frame, wherein each of said plurality of light emitting sections includes a first sight emitting element having a first sight emitting wavelength and a second light emitting element having a second light emitting wavelength different from said first light emitting wavelength, said second light emitting element at least partially surrounding said first light emitting element and wherein the second light emitting element extends halfway around the periphery of the first light emitting element.

7. A camera in which photographic data is recorded on a photographic film, comprising:

(a) an advancing means for advancing the photographic film:

(b) a plurality of light emitting sections aligned in a direction perpendicular to s film advancing direction and parallel to a photographic image plane of the film for exposing the photographic image plane of the film to form respective dots for the photographic data, each of said plurality of light emitting sections having a plurality of light emitting elements, each of said plurality of light emitting elements including a light emitting surface facing she photographic image plane, wavelengths of light emitted by said plurality of light emitting elements being different;

(c) memory means for storing she photographic data to be recorded at the photographic image plane; and (d) control means for storing on and off simultaneously said plurality of light emitting elements having said different wavelengths and belonging so selected ones of said plurality of light emitting sections in accordance with she data stored in said memory means while advancing she film by one frame, wherein each of said plurality of light emitting sections has three light emitting elements aligned in the film advancing direction, and wavelengths of light emitted from said three light emitting elements correspond to blue, green, and red respectively, and including control means for turning said three light emitting elements on and off simultaneously.

8. The camera of claim 7 further comprising:

a diffusing board provided on an upper portion of each of said plurality of light emitting sections for mixing light emitted from said plurality of said light emitting elements; and a light shielding member for holding said diffusion board and for blocking stray light from adjoining ones of said plurality of sections.

9. A camera in which photographic data is recorded on a photographic film, comprising:

(a) an advancing means for advancing the photographic film;

(b) a plurality of light emitting sections aligned in a direction perpendicular to a film advancing direction and parallel to a photographic image plane for exposing the photographic image plane to form respective dots for the data, each of said plurality of light emitting sections having a plurality of light emitting elements, each of said plurality of light emitting elements including a light emitting surface facing the photographic image plane, wherein a first plurality of said pluralities of light emitting elements in said plurality of light emitting sections have substantially the same first light emitting wavelength and are aligned in the direction perpendicular to the film advancing direction and parallel to the photographic image plane, and a second plurality of said pluralities of light emitting elements in said plurality of light emitting sections have differing light emitting wavelengths substantially different from said first light emitting wavelength and are aligned in the film advancing direction;

(c) memory means for storing photographic information to be recorded at the photographic image plane; and (d) control means for turning on and off selected ones of said first and second pluralities of light emitting elements in said plurality of light emitting sections in accordance with the data stored in said memory means while advancing the film by one frame to provide a multiple exposure by light of differing wavelengths at a position on the photographic image plane, said differing light emitting wavelengths differing sufficiently to avoid disappearance of a portion of said data on account of like color superposition.

10. A camera in which photographic data is recorded on a photographic film, comprising:

(a) an advancing means for advancing the photographic film;

(b) s plurality of light emitting sections aligned in a direction perpendicular to a film advancing direction and parallel to a photographic image plane of the film for exposing the photographic image plane of the film to form respective doses for she photographic data, each of said plurality of light emitting sections having a plurality of light emitting elements, each of said plurality of light emitting elements including a light emitting surface facing the photographic image plans, wavelengths of light emitted by said plurality of light emitting elements being different;

(c) memory means for storing the photographic data to be recorded at the photographic image plane; and (d) control means for turning on and off simultaneously said, plurality of light emitting elements having said different wavelengths and belonging to selected ones of said plurality of light emitting sections in accordance with the data stored in said memory means while advancing the film by one frame, wherein a first plurality of said pluralities of light emitting elements in said plurality of light emitting sections have substantially the same light emitting wavelength from among said different wavelengths and are aligned in the direction perpendicular to the film advancing direction and parallel to the photographic image plane, and a second plurality of said pluralities of light emitting elements in said plurality of light emitting sections have wavelengths that comprise the remainder of said different light emitting wavelengths, said remainder of said different light emitting wavelengths being sufficiently different from said substantially the same light emitting wavelength to avoid disappearance of a portion of said data on account of like color superposition, said second plurality being aligned in the film advancing direction, and further comprising:

a diffusing board provided on an upper portion of each of said plurality of light emitting sections for mixing light emitted from said plurality of said light emitting elements in a respective light emitting section; and a light-shielding member for holding said diffusion board and for blocking stray light from adjoining ones of said plurality of sections.

\* \* \* \* \*

UNITED STATES PATENT AND TRADEMARK OFFICE
CERTIFICATE OF CORRECTION

PATENT NO. : 5,655,165
DATED : August 05, 1997
INVENTOR(S) : Yoshiharu TAKAHASHI et al.

It is certified that error appears in the above-identified patent and that said Letters Patent is hereby corrected as shown below:

Title Page, item [73], "Assignee: Konic Corporation" should read --Assignee: Konica Corporation--.

Claim 1, column 11, line 9, "Sufficiently" should read --sufficiently--.

Claim 5, column 11, line 64, "sight" should read --light--;
       column 12, line 2, "sight" should read --light--;
              line 5, "sight" should read --light--;
           and line 8, "the" should read --like--.

Claim 6, column 12, line 33, "sight" should read --light--;
              line 42, "With" should read --with--;
              line 44, "sight" should read --light--;
           and line 45, "sight" should read --light--.

UNITED STATES PATENT AND TRADEMARK OFFICE
CERTIFICATE OF CORRECTION

PATENT NO. : 5,655,165
DATED : August 05, 1997
INVENTOR(S) : Yoshiharu TAKAHASHI et al.

It is certified that error appears in the above-identified patent and that said Letters Patent is hereby corrected as shown below:

Claim 7, column 12, line 58, "s film" should read --a film--;
        column 13, line 1, "she" should read --the--;
                line 5, "so" should read --to--;
                line 7, "she" should read --the--;
       and line 8, "she" should read --the--.

Claim 10, column 14, line 10, "s plurality" should read --a plurality--;
                      line 14, "doses for she" should read --dots for the--;

UNITED STATES PATENT AND TRADEMARK OFFICE
CERTIFICATE OF CORRECTION

PATENT NO. : 5,655,165
DATED : August 05, 1997
INVENTOR(S) : Yoshiharu TAKAHASHI et al.

It is certified that error appears in the above-identified patent and that said Letters Patent is hereby corrected as shown below:

line 18, "plans" should read --plane--; and line 24, "said, plurality" should read --said plurality--.

Signed and Sealed this

Third Day of November, 1998

*Attest:*

*Attesting Officer*

BRUCE LEHMAN

*Commissioner of Patents and Trademarks*